US006691852B1

(12) United States Patent
Nolin

(10) Patent No.: US 6,691,852 B1
(45) Date of Patent: Feb. 17, 2004

(54) METHOD, APPARATUS AND SYSTEM FOR DELIVERING DRY BULK FREE-FLOWING MATERIAL INTO A CONTAINER

(76) Inventor: Karl W. Nolin, 1510 Country Club La., Spencer, IA (US) 51301

( * ) Notice: Subject to any disclaimer, the term of this patent is extended or adjusted under 35 U.S.C. 154(b) by 21 days.

(21) Appl. No.: 10/063,758

(22) Filed: May 10, 2002

(51) Int. Cl.[7] .......................... B65G 11/12; B65G 11/18
(52) U.S. Cl. ..................... 193/2 A; 193/2 R; 193/29; 193/32
(58) Field of Search ................... 193/2 R, 9, 28, 193/29, 32, 2 A; 414/299

(56) References Cited

U.S. PATENT DOCUMENTS

| | | | | |
|---|---|---|---|---|
| 4,095,625 A | * | 6/1978 | Marpe | 141/93 |
| 4,342,383 A | * | 8/1982 | Burnett | 193/32 |
| 4,552,573 A | * | 11/1985 | Weis et al. | 55/312 |
| 4,569,432 A | * | 2/1986 | Zentgraf et al. | 193/32 |
| 4,603,769 A | * | 8/1986 | Bach et al. | 193/12 |
| 4,623,056 A | * | 11/1986 | Flaugher | 193/23 |
| 5,009,552 A | * | 4/1991 | Talcott | 406/193 |
| 5,286,155 A | * | 2/1994 | Straub | 414/139.4 |
| 5,454,490 A | * | 10/1995 | Johanson | 222/146.4 |
| 6,073,802 A | * | 6/2000 | Sampson et al. | 222/54 |
| 6,085,987 A | * | 7/2000 | Haraway | 239/11 |

OTHER PUBLICATIONS

Willis, *Fabricators of: Parts and Accessories for: Dry–Free Flowing Material Handling*, pp. 157–158, Willis Distributing Inc., Benton, Illinois.
"Material Handling Price Book", GSI Material Handling, Assumption, Illinois.
Brochure entitled "Grain Damage Prevention Chart 2001".
Brochure entitled *"Elevator Accessories"* By Ross Manufacturing Company, Brownsville, Tennessee.
Creamer Metal Products, Inc., London, Ohio.
Lambton Conveyor Flow System Accessories.
Seedburo brochure.

* cited by examiner

*Primary Examiner*—Douglas Hess
(74) *Attorney, Agent, or Firm*—Simmons, Perrine, Albright & Ellwood P.L.C.

(57) ABSTRACT

A system and method for changing a flow rate and direction of dry bulk material supplied from an elevated source via an angled spout to an adjustable spout end having an oversized input sleeve with internal baffles therein.

22 Claims, 3 Drawing Sheets

METHOD, APPARATUS AND SYSTEM FOR DELIVERING DRY BULK FREE-FLOWING MATERIAL INTO A CONTAINER

BACKGROUND OF INVENTION

In recent years, grain elevators and feed mills have necessarily become increasingly efficient in their operations. Many customers of elevators and feed mills now operate on a "just-in-time" basis. Consequently, it is becoming increasingly important to minimize the duration of any elevator or mill downtime.

In the past, grain handling equipment manufacturers have sold adjustable spout ends which are placed at a lower end of an upwardly angled spout. The spout ends are typically disposed over the center of a grain bin, and the spout ends typically direct material into the center of the bin in a substantially vertical column. One example of such an adjustable spout end is the "Original Style" Adjustable Spout End made by Nolin Milling, Inc. of Dickens, Iowa. This adjustable spout end has a pivoting top flange which bolts, clamps or is welded, etc. to a spout which supplies material from an elevated position. This spout end includes a plurality of internal baffles fixed in a stationary bottom section which is fixed to the top of the bin. These baffles are known to cause a backing up of the material within the adjustable spout end when material is provided at a sufficiently high flow rate. Once a sufficient flow is present, the grain entering the adjustable spout end strikes the reservoir of grain backing up. The incoming grain is thereby relatively gently decelerated by collision with the numerous movable grain particles building up inside the adjustable spout end. Once the grain is slowed and transformed into a substantially vertical columnar flow, it enters the top of the bin.

While these adjustable spout ends have enjoyed much success and have been used extensively in the past, they do have some drawbacks.

First of all, the effectiveness and efficiency of the grain-to-grain deceleration, occurring when incoming grain strikes grain pooling within the adjustable spout end, is at least somewhat dependent upon the angle between the incoming spout and the baffles fixed within the adjustable spout end and upon the flow rate of material through the spout. These adjustable spout ends generally operate optimally at a maximum spout flow rate and at some angle of arrival between 38 degrees and 90 degrees. These adjustable spout ends often operate sub-optimally as the flow rate decreases and/or the angle of the spout departs from the optimal orientation.

Secondly, repair and/or replacement of these adjustable spout ends often require considerable precision in situ cutting of the spout (often to within $\frac{1}{16}^{th}$ of an inch), and, therefore, much time and attention are required. In some cases, such as replacement of a spout end located inside a grain elevator or feed mill, etc. (because of the danger of a grain dust explosion), it may be necessary to obtain a "hot work permit" and to completely shut down the entire operation while any in situ welding or spout cutting is performed.

Thirdly, due to normal thermal and load-related expansion and contraction of the spout and the grain bin, the adjustable spout end and its connections to the spout and the grain bin may become distressed and distorted, thereby requiring repair and/or replacement.

Fourthly, the spouts may periodically need to be rotated so as to cause wear to occur more evenly and thereby extend the useful life of the spout. When this task is performed, it is often necessary to unbolt both ends of the spout and support the spout with a crane. This high level of effort and expense often discourages proper maintenance of the spouts.

Consequently, there exists a need for improved methods and systems for providing, maintaining, repairing and replacing equipment for delivering and decelerating dry bulk material in an efficient manner.

SUMMARY OF INVENTION

It is an object of the present invention to provide a system and method for decelerating dry bulk material in an efficient manner.

It is a feature of the present invention to utilize a pivoting oversized input spout sleeve.

It is an advantage of the present invention to simplify and enhance the coupling of the adjustable spout end to the spout.

It is another feature of the present invention to integrate a series of baffles within the pivoting input spout sleeve.

It is another advantage of the present invention to reduce the differential in baffle performance as a function of spout angle, thereby providing a more consistently gentle deceleration of material being handled.

It is yet another feature of the present invention to include a series of outlets from the oversized input spout sleeve.

It is yet another advantage of the present invention to permit variable flow rates, including minimal flow rates, while concomitantly providing for self-cleaning capabilities, over a wide range of spout angles.

The present invention is an apparatus and method for decelerating dry bulk material into a container, designed to satisfy the aforementioned needs, provide the previously stated objects, include the above-listed features, and achieve the already articulated advantages. The present invention is carried out in a "wasted time-less" manner in a sense that the time consumed in properly maintaining a functional spout end system, over its lifetime, has been greatly reduced.

Accordingly, the present invention is a system and method including an adjustable spout end having an oversized pivoting input sleeve with internal baffles therein.

BRIEF DESCRIPTION OF DRAWINGS

The invention may be more fully understood by reading the following description of the preferred embodiments of the invention, in conjunction with the appended drawings wherein.

DETAILED DESCRIPTION

Figure 1:
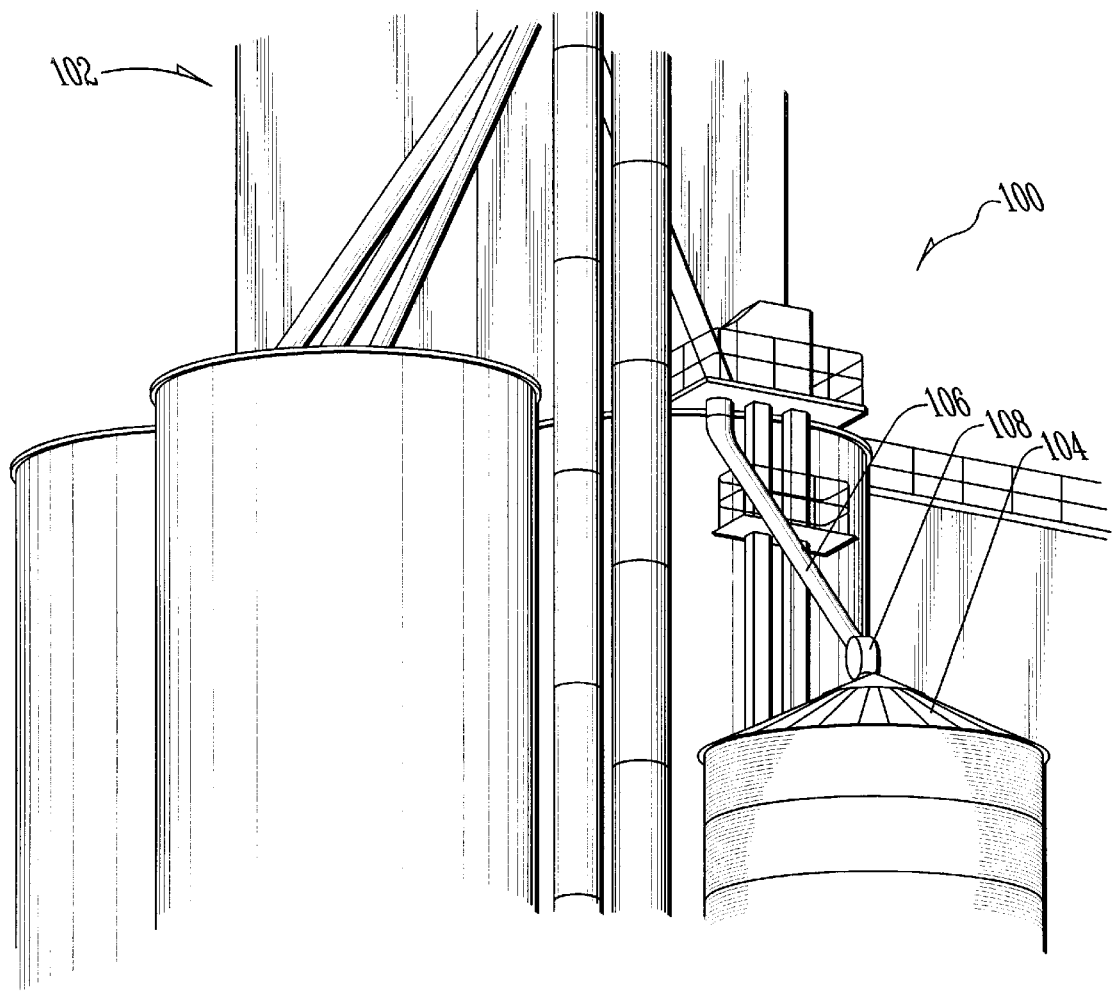
FIG. 1 is a perspective view of a grain elevator system of the present invention.

Now referring to the drawings wherein like numerals refer to like matter throughout, and more specifically referring to FIG. 1, there is shown a grain elevator system of the present invention generally designated 100, including an elevated position 102 from which grain or other dry bulk material is provided to a grain bin 104, via an angled gravity flow down spout 106 with a novel adjustable spout end 108 disposed at its lower end. The entire grain elevator system 100, except for adjustable spout end 108, are well known in the industry.

Figure 2:
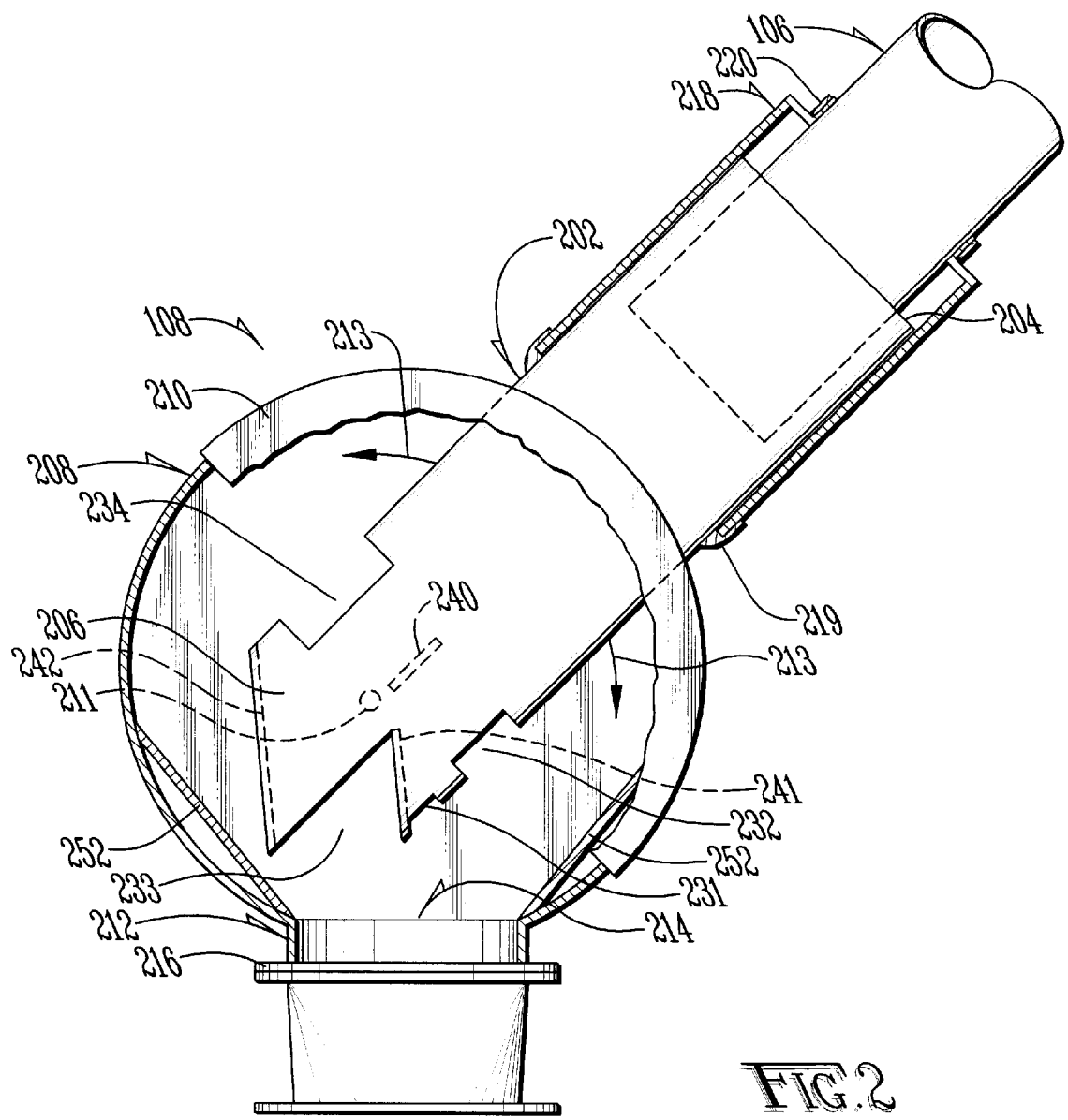
FIG. 2 is a more detailed partially cut-away view of the adjustable spout end 108 of FIG. 1.

Now referring to FIG. 2, there is shown a more detailed view of the adjustable spout end 108 of FIG. 1, including an oversized spout receiving sleeve 202, which has an internal dimension larger than the external dimension of angled gravity flow down spout 106. Both angled gravity flow down spout 106 and oversized spout receiving sleeve 202 are shown as being pipes having a circular cross section. It should be understood that this is only one embodiment of the present invention. Angled gravity flow down spout 106 and oversized spout receiving sleeve 202 could be any shaped member, conduit, channel, pipe, tube, chute, shaft, such as, but not limited to, a square or round chute (FIG. 2). Various other shapes and configurations of angled gravity flow down spout 106 and oversized spout receiving sleeve 202 could be envisioned as well, so long as such other configurations permit angled gravity flow down spout 106 to be received into oversized spout receiving sleeve 202. However, the present invention could be constructed such that angled gravity flow down spout 106 slides over oversized spout receiving sleeve 202. (In such cases, it then could be called an undersized spout insert 202.) In a preferred embodiment, angled gravity flow down spout 106 may have an exterior circumference of 8 inches, and the interior circumference of oversized spout receiving sleeve 202 would be slightly larger than 8 inches so as to allow angled gravity flow down spout 106 to easily slide into oversized spout receiving sleeve 202. In a preferred embodiment, angled gravity flow down spout 106 is gravity fed; however, in some instances, it may be desired to have some mechanism for assisting material in flowing through the spout, such as, but not limited to, a conveyor, auger or other material moving apparatus.

Oversized spout receiving sleeve 202 is shown having an oversized spout receiving sleeve top end 204, which receives angled gravity flow down spout 106 and is further shown having an oversized spout receiving sleeve bottom end 206 from which the grain is dispensed from oversized spout receiving sleeve 202. Oversized spout receiving sleeve 202 can be made of any suitable material, but it is preferred that it be made of the same material or a material with similar properties as the material of angled gravity flow down spout 106. In a preferred embodiment, oversized spout receiving sleeve 202 is a steel pipe. Angled gravity flow down spout 106 preferably extends into oversized spout receiving sleeve 202 by a predetermined sleeve penetration distance. The predetermined sleeve penetration distance can be variable, depending upon each particular application. Some of the factors which can be used to determine the predetermined penetration distance would be the amount of expansion and contraction of the grain bin 104 resulting from loading forces, as well as thermal expansion characteristics of grain bin 104, thermal coefficients of expansion of angled gravity flow down spout 106, measurement tolerances for cutting a length of angled gravity flow down spout 106, and other suitable factors.

Adjustable spout end 108 has an adjustable spout end main body 208 with a slot therein for receiving oversized spout receiving sleeve 202 at various angular orientations. Adjustable spout end main body 208 may be many shapes, but a shape of a thick substantially circular disk standing on edge may be preferred. The slot in the top edge of adjustable spout end main body 208 is covered by an adjustable spout end main body sliding top section 210, through which oversized spout receiving sleeve 202 extends. Oversized spout receiving sleeve 202 is preferably pivotally mounted on a pin 211, which pivoting relationship, indicated by arrows 213, can be selectively enabled or disabled by tightening a tensioning nut on said pin 211. Adjustable spout end main body 208 includes an adjustable spout end main body fixed bottom section 212, which has an adjustable spout end main body fixed bottom section material outlet opening 214, which is coupled to grain bin 104 (FIG. 1) via an adjustable spout end main body fixed bottom section bin attachment flange 216, preferably by bolting, but other suitable means of attachment may be substituted when desired. In a preferred embodiment, adjustable spout end main body 208 is made of steel.

Oversized spout receiving sleeve top end 204 is protected from the elements by oversized spout receiving sleeve top end covering sleeve 218, which is coupled to angled gravity flow down spout 106 by oversized spout receiving sleeve top end covering sleeve mounting clamp 220 or other suitable means for attachment. Oversized spout receiving sleeve top end covering sleeve 218 prevents rain from entering into oversized spout receiving sleeve top end 204 and further helps to prevent grain dust, etc. from exiting into the air through oversized spout receiving sleeve top end 204. In applications where adjustable spout end 108 is deployed inside a closed building, it may be desired that oversized spout receiving sleeve top end covering sleeve mounting clamp 220 may be sealed to angled gravity flow down spout 106 using any suitable sealing means, such as gaskets, caulking, etc. Similarly, a silicone seal 219 or the like may be used to seal the bottom edge of oversized spout receiving sleeve top end covering sleeve 218 to the side of oversized spout receiving sleeve 202, so that grain dust does not escape. Of course, if oversized spout receiving sleeve 202 were inserted into angled gravity flow down spout 106 instead of vice versa, then it may not be necessary to include oversized spout receiving sleeve top end covering sleeve 218 and oversized spout receiving sleeve top end covering sleeve mounting clamp 220.

Also shown in FIG. 2 are the four openings 231, 232, 233, and 234 through which grain may exit oversized spout receiving sleeve 202. These openings may be created by cutting holes in the oversized spout receiving sleeve bottom end 206. The size, placement and orientation of these openings are important to the optimal operation of the present invention. The internal baffle 240 is shown as well. First end 241 may be a plate welded to an end portion of oversized spout receiving sleeve 202. Similarly, second end 242 can be another plate welded to an end portion of oversized spout receiving sleeve 202. Wear plates 252, which are intended to extend the life of adjustable spout end main body 208, may be installed within adjustable spout end main body 208, such that said wear plates are readily replaceable in the event of degradation resulting from impact of grain incident thereon.

Figure 3:
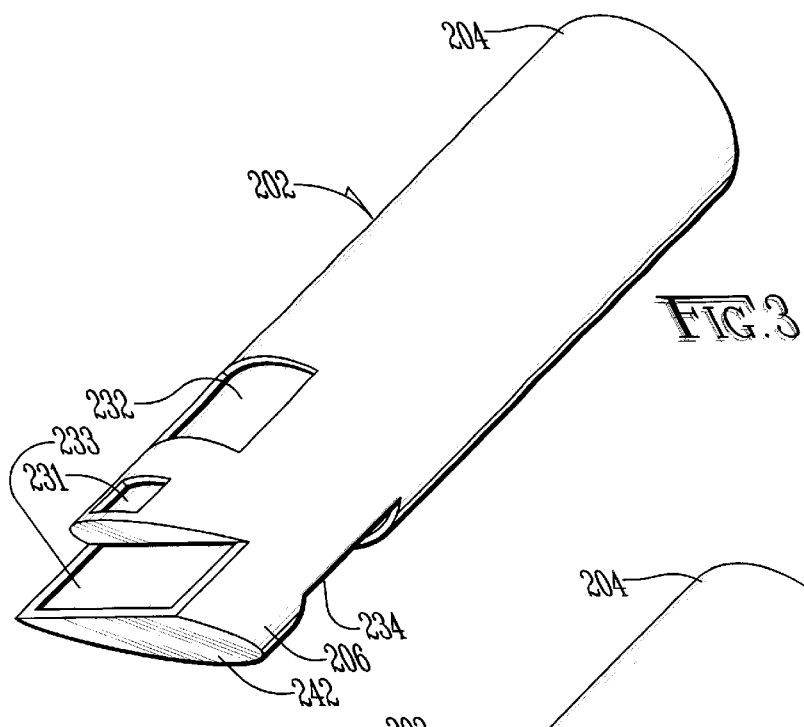
FIG. 3 is a perspective view of a bottom side of a preferred embodiment of the present invention having a round pipe for oversized spout receiving sleeve 202.

Now referring to FIG. 3, there is shown a bottom view of a preferred embodiment of the present invention where the oversized spout receiving sleeve 202 is a round pipe.

Figure 4:
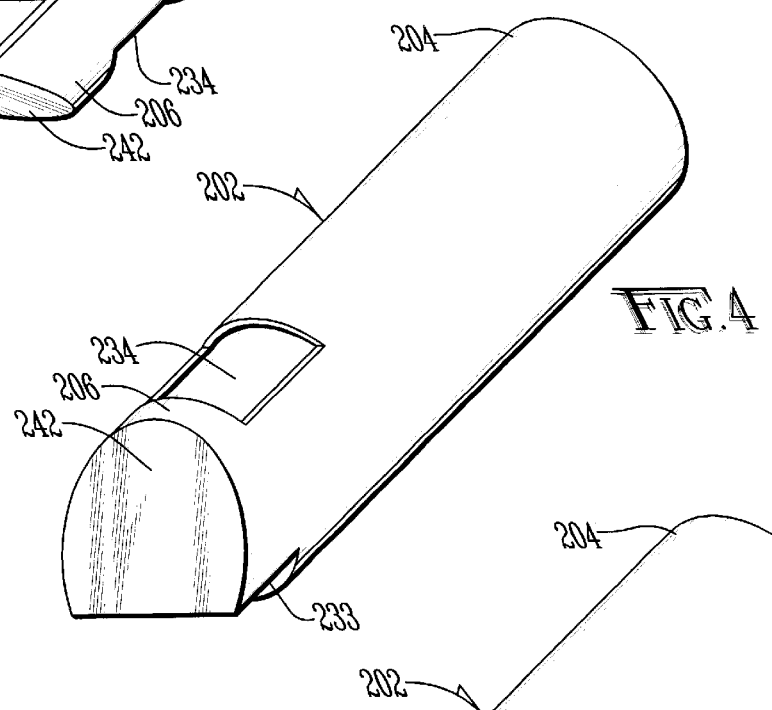
FIG. 4 is a perspective representation of a top view of the oversized spout receiving sleeve 202 of FIGS. 2 and 3.

Now referring to FIG. 4, there is a top view of the oversized spout receiving sleeve 202 of FIGS. 2 and 3.

Figure 5:
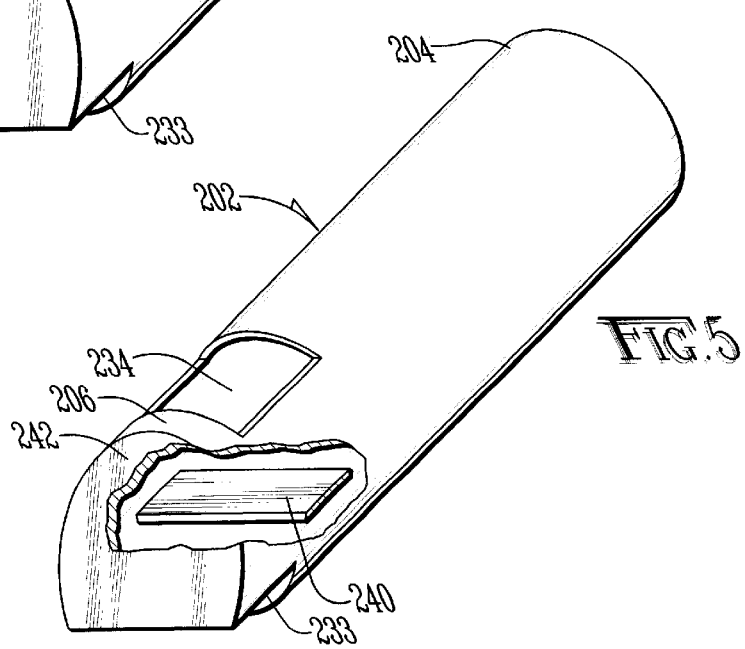
FIG. 5 is a perspective cut-away representation of the oversized spout receiving sleeve 202 of FIGS. 2, 3, and 4 which reveals the internal baffle 240.

Now referring to FIG. 5, there is shown a partially cut-away view of the oversized spout receiving sleeve 202 of FIGS. 2, 3, and 4, which reveal the internal baffle 240.

In operation, the apparatus and method of the present invention as described in the Figures, could function as follows:

Assume an increasing flow rate. As grain flows down through angled gravity flow down spout 106, past oversized spout receiving sleeve top end covering sleeve mounting clamp 220, also through oversized spout receiving sleeve top end covering sleeve 218, and then past oversized spout receiving sleeve top end 204 of and also through oversized spout receiving sleeve 202, it exits angled gravity flow down spout 106 and is carried by oversized spout receiving sleeve 202. As the grain flows through oversized spout receiving sleeve 202, it first exits through openings 231 or 232. As the flow rate increases, an impact buffering pile of grain begins to build next to first end 241. As the flow rate increases further, it begins to overflow past first end 241 and begins to flow out opening 233. As the flow rate increases further, a second impact buffering pile begins to build next to second end 242, until it backs up and the grain begins to flow out opening 234. Consequently, the grain will primarily exit the oversized spout receiving sleeve 202 at certain low flow rates through opening 231; as the flow rate increases, then opening 232 will begin to flow with the highest rate, then opening 233 will begin to flow, and finally opening 234 will flow. If the flow of grain down oversized spout receiving sleeve 202 is terminated, then the present invention is designed to permit the grain therein to fully drain from inside the adjustable spout end 108.

In a preferred embodiment of the present invention where adjustable spout end 108 is an 8-inch spout (exterior dimension), opening 231 could be 2.25 inches by 1.125 inches (arc length). Opening 232 would be 5 inches by 2.15 inches (arc length). Opening 233 would be 4 inches by 8 inches (diameter), and opening 234 would be 5 inches by 7.5 inches (arc length).

Throughout this description, reference is made to grain, grain handling, grain elevators, grain bins and to feed and feed mills, because it is believed that the beneficial aspects of the present invention would be most readily apparent when used in connection with grain and feed; however, it should be understood that the present invention is not intended to be limited to grain and feed handling and should be hereby construed to include other agricultural and non-agricultural applications as well. For example only, and not intended as a limitation, the dry bulk material may be corn, soybeans, wheat, rice, almonds, walnuts, peas, coffee beans, paint pigment, or any free-flowing dry bulk material. The term "dry bulk material" is intended to refer to the above-listed materials and other materials having similar properties.

In operation, the bulk material delivery system of the present invention could be assembled as follows:
1. An angled gravity flow down spout 106 is coupled at its upper end to a source of dry bulk material.
2. Oversized spout receiving sleeve top end covering sleeve 218 and oversized spout receiving sleeve top end covering sleeve mounting clamp 220 are slid over the bottom end of angled gravity flow down spout 106.
3. Oversized spout receiving sleeve 202 is slid over the bottom end of angled gravity flow down spout 106.
4. Oversized spout receiving sleeve 202 is pivoted about pin 211 so as to provide the proper angle between angled gravity flow down spout 106 and the top of grain bin 104.
5. The adjustable spout end 108 is attached to the top of grain bin 104.
6. The nut on pin 211 is tightened to prevent unwanted pivoting of oversized spout receiving sleeve 202.
7. Oversized spout receiving sleeve top end covering sleeve 218 is slid down angled gravity flow down spout 106 past oversized spout receiving sleeve top end 204, but preferably not so far that the top of oversized spout receiving sleeve top end covering sleeve 218 or oversized spout receiving sleeve top end covering sleeve mounting clamp 220 actually contacts oversized spout receiving sleeve top end 204. The gap which is left between oversized spout receiving sleeve top end 204 and the top of oversized spout receiving sleeve top end covering sleeve 218 is done so as to permit expansion and contraction of the various components of the system.
8. In some situations, it may be desirable to place a seal 219 between the bottom edge of oversized spout receiving sleeve top end covering sleeve 218 and the exterior of oversized spout receiving sleeve 202.

In operation, the bulk material delivery system 100 of the present invention could be at least partially maintained as follows:

To extend the life of angled gravity flow down spout 106, it may need to be rotated. The process for rotating angled gravity flow down spout 106 could be accomplished as follows:
1. Angled gravity flow down spout 106 is detached at its top end from elevated position 102.
2. Angled gravity flow down spout 106 can be rotated without the need for detaching the bottom of angled gravity flow down spout 106 for adjustable spout end 108.
3. The angled gravity flow down spout 106 can then be reattached at the elevated position 102.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. A system for delivery of dry bulk material, the system comprising:

a sleeve, having a first end, a second end and a longitudinal axis extending therebetween, the sleeve being sized and configured to receive therein an input conduit configured for carrying a dry bulk material;

an adjustable spout end main body, configured to receive said sleeve in a movable manner, so that an angle of said sleeve, with respect to said spout end main body, can be variable; and, a means for restricting flow coupled to and moving along with said sleeve, said means for restrictiong flow sized, positioned and configured to decelerate said dry bulk material.

2. A system of claim 1 wherein:

said sleeve has a predetermined sleeve cross-section shape, and said input conduit has a predetermined input conduit cross-section shape;

said predetermined sleeve cross-section shape and said predetermined input conduit cross-section shape share a general cross-section shape characteristic;

said movable manner is a translation of a portion of said sleeve along a top surface of said adjustable spout end main body; and, means for restricting flow is barrier plate disposed within said sleeve.

3. A system of claim 2 wherein said general cross-section shape characteristic is non-circular.

4. A system of claim 2 wherein said translation of a portion of said sleeve along a top surface of said adjustable spout end main body is along a curved portion of said adjustable spout end main body, and further said movable manner is a selectively securable pivoting of said sleeve about a pivoting axis which is substantially orthogonal to said longitudinal axis.

5. A system of claim 4 wherein:

said input conduit is an angled gravity flow down spout; and, said sleeve is sized and configured to receive said angled gravity flow down spout therein, such that said angled gravity flow down spout extends a predetermined sleeve penetration distance into said sleeve; where said predetermined sleeve penetration distance is at least in part based upon a co-efficient of thermal expansion of said angled gravity flow down spout and a length characteristic of said angled gravity flow down spout.

6. A system of claim 5 further comprising a plurality of orifices in said oversized spout receiving sleeve, at a location within said adjustable spout end main body, said plurality of orifices being positioned and configured to permit self cleaning of said dry bulk material from inside said sleeve by gravitational forces.

7. A system of claim 6 further comprising a plurality of means for restricting flow to said sleeve and configured to cooperate with said plurality of orifices such that an increase in flow rate of said dry bulk material will increase a number of flow restricting members which are effective in deceleration of said dry bulk material.

8. A system of claim 7 wherein at least one of said plurality of means for restricting flow is not effective in decelerating said dry bulk material when a flow rate of said dry bulk material is below a threshold flow rate.

9. A system of claim 8 wherein at least one of said plurality of orifices does not discharge dry bulk material when said dry bulk material is below said threshold flow rate.

10. A system of claim 9 wherein said angled gravity flow down spout can be rotated with respect to said adjustable spout end main body without disengaging said angled gravity flow down spout from said sleeve.

11. A system of claim 10 further comprising an angled gravity flow down spout without a flange at a lower end for firmly attaching to a spout end.

12. A system of claim 11 wherein said dry bulk material is soybeans.

13. A method of extending a useful life characteristic of an angled gravity flow down spout having a top end and a bottom end and a circular cross-section, said spout extending between an elevated position and a storage bin, the method comprising the steps of:

disengaging a portion of said top end from a portion of a member disposed at said elevated position; and, rotating said angled gravity flow down spout, without making any adjustment which results in a less firmly bound coupling between said bottom end and a spout end coupled to said storage bin.

14. A method of changing a velocity of a dry bulk material comprising the steps of:

providing a downspout from an elevated position;

providing a sleeve over a lower end of said downspout;

said sleeve having a top end and a bottom end;

said sleeve further having a plurality of orifices therein which sequentially begin to discharge dry bulk material from said sleeve as a flow rate of dry bulk material is increased in said downspout and said sleeve;

providing at least one flow restricting means which does not restrict flow until a threshold flow rate has been exceeded; and locating, sizing and orienting said one flow restricting means and at least one of said plurality of orifices such that dry bulk material disposed inside said sleeve will, with the aid of gravity alone, be fully discharged from said sleeve.

15. A dry bulk material delivery system comprising:

means for transporting dry bulk material from an elevated position to a lower position;

means for containing dry bulk material, where dry bulk material is fed therein via an input port therein;

means for changing a flow direction of dry bulk material subsequent to exiting said means for transporting grain and prior to containment in said means for containing dry bulk material;

means for coupling said means for changing with said means for transporting such that a thermal expansion of said means for transporting dry bulk material will result in a relative translation between a first dry bulk material conduit and a sleeve member disposed about said first dry bulk material conduit;

said means for coupling further configured to prevent falling matter from entering said means for containing dry bulk material by passage through a gap between said first dry bulk material conduit and said sleeve member.

16. A system of claim 15 wherein:

said means for transporting is a gravity flow down spout.

17. A system of claim 16 wherein said sleeve member is not said gravity flow down spout; and, said means for coupling further includes an outer sleeve, having a circular cross-section, said outer sleeve extending over a portion of said sleeve member.

18. A system of claim 16 comprising:

means for pivoting said sleeve member with respect to an exit opening of said means for changing.

19. A system of claim 18 wherein said sleeve member is a pipe having a flow restricting member coupled thereto; and, wherein said pipe has a plurality of openings therein for discharging dry bulk material.

20. A system of claim 19 wherein said flow restricting member and said plurality of openings are mutually configured so that some lower flow rates of dry bulk material through said pipe will result in dry bulk material exiting through fewer of said plurality of openings than would otherwise occur for higher flow rates of said dry bulk material.

21. A system of claim 20 wherein:

said flow restricting member is a first end coupled to a portion of said pipe adjacent a first opening of said plurality of openings; and, said system further comprising:

a second end coupled to said pipe adjacent another of said plurality of openings;

said first end and said first opening being configured so that dry bulk material disposed immediately above said first end can drain via a gravity flow, irrespective of whether said pipe is oriented at any angle between vertical and 52 degrees from vertical; and, said second end and said another of said plurality of openings being configured so that dry bulk material disposed immediately above said second end can drain via a gravity flow, irrespective of whether said pipe is oriented at any angle between vertical and 52 degrees from vertical.

22. A system of claim 21 further comprising:

an internal baffle plate disposed inside said pipe and above said first end, said second end, said first opening, said another of said plurality of openings; and said internal baffle plate being substantially planar and oriented in a plane parallel with a longitudinal axis of said pipe.

\* \* \* \* \*

UNITED STATES PATENT AND TRADEMARK OFFICE
CERTIFICATE OF CORRECTION

PATENT NO. : 6,691,852 B1
DATED : February 17, 2004
INVENTOR(S) : Karl W. Nolin

It is certified that error appears in the above-identified patent and that said Letters Patent is hereby corrected as shown below:

Column 7,
Line 19, after the word "flow", please insert the word -- coupled --.

Column 8,
Line 28, after the number "16", please insert the word -- further --.

Signed and Sealed this

Twenty-fifth Day of May, 2004

JON W. DUDAS
*Acting Director of the United States Patent and Trademark Office*